(12) United States Patent
Liu et al.

(10) Patent No.: US 11,099,585 B2
(45) Date of Patent: Aug. 24, 2021

(54) PIPE NETWORK EVALUATION DEVICE AND METHOD

(71) Applicant: Hitachi Industrial Equipment Systems Co., Ltd., Tokyo (JP)

(72) Inventors: Yaping Liu, Tokyo (JP); Tatsurou Yashiki, Tokyo (JP); Yukinori Katagiri, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 598 days.

(21) Appl. No.: 16/068,057

(22) PCT Filed: Dec. 22, 2016

(86) PCT No.: PCT/JP2016/088265
§ 371 (c)(1),
(2) Date: Jul. 3, 2018

(87) PCT Pub. No.: WO2017/119306
PCT Pub. Date: Jul. 13, 2017

(65) Prior Publication Data
US 2020/0278704 A1    Sep. 3, 2020

(30) Foreign Application Priority Data

Jan. 4, 2016  (JP) .............................. JP2016-000031

(51) Int. Cl.
*G05D 7/06* (2006.01)
*G05B 15/02* (2006.01)
(Continued)

(52) U.S. Cl.
CPC ............. *G05D 7/0623* (2013.01); *G01F 1/00* (2013.01); *G05B 15/02* (2013.01); *G05D 7/0664* (2013.01);
(Continued)

(58) Field of Classification Search
USPC .......................................................... 702/45
See application file for complete search history.

(56) References Cited

U.S. PATENT DOCUMENTS

| 5,414,641 A | 5/1995 | Shinoaki et al. |
| 2005/0216242 A1* | 9/2005 | Flax .................. G06F 30/20 703/9 |

(Continued)

FOREIGN PATENT DOCUMENTS

| JP | 9-217900 A | 8/1997 |
| JP | 2001-280597 A | 10/2001 |
| JP | 2002-92054 A | 3/2002 |

OTHER PUBLICATIONS

International Search Report (PCT/ISA/210) issued in PCT Application No. PCT/JP2016/088265 dated Apr. 4, 2017 with English translation (two (2) pages).
(Continued)

*Primary Examiner* — Paul D Lee
(74) *Attorney, Agent, or Firm* — Crowell & Moring LLP (57) ABSTRACT

Provided is a pipe network evaluation device that is capable of calculating a pressure loss in a pipe network and a consumption flow rate of compressed air in each terminal equipment without inputting layout information on devices, even in a case where there are some devices, the layout information about which is difficult to ascertain visually or obtain from a building drawing, or the like. Provided is a pipe network evaluation device that estimates the resistance of a pipe, the layout information about which is unknown, on the basis of pressure data on compressed air in an air tank, flow rate data on compressed air supplied from the air tank, layout unknown-part pipe outlet pressure data, for which layout information is unknown, and layout known-part pipe layout information, for which layout information is known.

8 Claims, 9 Drawing Sheets

(51) Int. Cl.
*G06G 7/50* (2006.01)
*G01F 1/00* (2006.01)

(52) U.S. Cl.
CPC ........ *G06G 7/50* (2013.01); *F15B 2211/6654* (2013.01)

(56) References Cited

U.S. PATENT DOCUMENTS

2010/0299122 A1* 11/2010 Golinveaux ............ G06F 30/20
703/9
2014/0123962 A1* 5/2014 Ide .................... F02M 25/0836
123/520

OTHER PUBLICATIONS

Japanese-language Written Opinion (PCT/ISA/237) issued in PCT Application No. PCT/JP2016/088265 dated Apr. 4, 2017 (three (3) pages).

* cited by examiner

PIPE NETWORK EVALUATION DEVICE AND METHOD

TECHNICAL FIELD

The present invention relates to a pipe network evaluation device and method for calculating a pressure loss due to a fluid in a pipe network including a fluid equipment and a pipe.

BACKGROUND ART

A pneumatic system which supplies compressed air to each department in a factory is a pipe equipment which temporarily accumulates compressed air compressed by an air compressor in an air tank and supplies the compressed air from the air tank through a pipe route and a pneumatic equipment (a filter, a drier, a control valve, and the like) to an equipment (terminal equipment) consuming the compressed air in a production process of a factory, such as an air cylinder or an air blow in the factory. Recently, in the trend of power consumption reduction such as global warming prevention and energy saving laws, reduction of power consumption is demanded even in factories. Therefore, in order to reduce the power consumption of the air compressor by optimizing the entire pneumatic system, it is essential to evaluate the pressure loss of the pneumatic system and strengthen energy saving measures based on the evaluation. In addition, in the energy saving measures, it is necessary to estimate a consumption flow rate of compressed air in a terminal facility so as to grasp the amount of air leakage, but it may be difficult to acquire a specific consumption flow rate according to an installation position of a measurement device such as a flowmeter.

Conventionally, layout information (connection relationship, attribute information) of pipes, elbows, valves, and the like, which are equipments constituting the pneumatic system of the factory, is modeled as a pipe network by building drawings and visual inspection. Furthermore, based on the layout information and calculation formulae, a resistance coefficient of each equipment is calculated by a calculator or the like to evaluate the pressure loss of the pipe network. In addition, Patent Literature 1 discloses a technique which designs a pipe network by CAD software, uses CAD figure data to create a worksheet corresponding to attribute information of equipments constituting the pipe network, acquires a resistance coefficient of each equipment based on a predetermined calculation formula, and acquires a pressure loss of each equipment from the resistance coefficient and the attribute information.

CITATION LIST

Patent Literature

Patent Literature 1: JP-A-2002-92054

SUMMARY OF INVENTION

Technical Problem

In a conventional technique, in order to calculate the pressure loss of the pipe network, the layout information of the equipments constituting the pipe network of the factory is grasped and such information has to be input to a computer for each equipment, which is a considerable burden to an operator. Since factory pipe layout information is often not written in the building drawings and the pipes are arranged under the ceiling and under the floor, there is a difficulty in visual inspection. Furthermore, in many cases, the layout information of the equipment to be additionally installed in the existing equipment is not managed and the history does not remain.

In Patent Literature 1, as described above, a pipe network is designed by CAD software, CAD figure data is used to create a worksheet corresponding to attribute information of equipments constituting the pipe network, a resistance coefficient of each equipment is acquired based on a predetermined calculation formula, and a pressure loss of each equipment is acquired from the resistance coefficient and the attribute information. However, it is indispensable to input layout information in advance by using the CAD software. That is, in the technique disclosed in Patent Literature 1, it is necessary to grasp the layout information of each equipment and input the layout information, so as to evaluate the pressure loss of the existing pipe network.

In addition, in a conventional technique, a flow rate sensor is installed to measure a flow rate so as to evaluate a consumption flow rate of compressed air in a terminal equipment. However, there is a problem that the number of installation steps of the flow rate sensor is increased, the flow rate sensor is also expensive, and the durability thereof is poor.

The present invention has been made in view of the above circumstances, and an object of the present invention is to provide a pipe network evaluation device capable of calculating a pressure loss of a pipe network and a consumption flow rate of compressed air in each terminal equipment, without inputting layout information even when the pipe network includes an equipment that is difficult to grasp equipment layout information by building drawings and visual inspection.

Solution to Problem

In order to achieve the above object, the present invention provides a pipe network evaluation device for calculating a flow of a fluid in a pipe network in consideration of a friction loss and a heat loss of a fluid equipment and a pipe based on a pipe network model including the fluid equipment and the pipe, the pipe network evaluation device including: a layout-unknown part pipe resistance estimating means, based on: pressure data of compressed air in the air tank; flow rate data of the compressed air supplied from the air tank; layout-unknown part pipe outlet pressure data of which layout information is unknown; and layout-known part pipe layout information of which layout information is known.

Advantageous Effects of Invention

As described above, according to the present invention, it is possible to reduce the time and effort of setting pipe information by estimating a pipe resistance of a layout-unknown part based on measurement and pipe network calculation, regardless of building drawings or visual inspection. Furthermore, it is possible to evaluate a pressure loss of a pipe network including a layout-unknown part and a consumption flow rate of each terminal equipment, without installing a flow sensor at the terminal equipment.

DESCRIPTION OF EMBODIMENTS

Hereinafter, a pipe network evaluation device including a layout-unknown part according to a mode for carrying out the present invention (hereinafter referred to as an embodiment) will be described with reference to the drawings.

Embodiment 1

Figure 1:
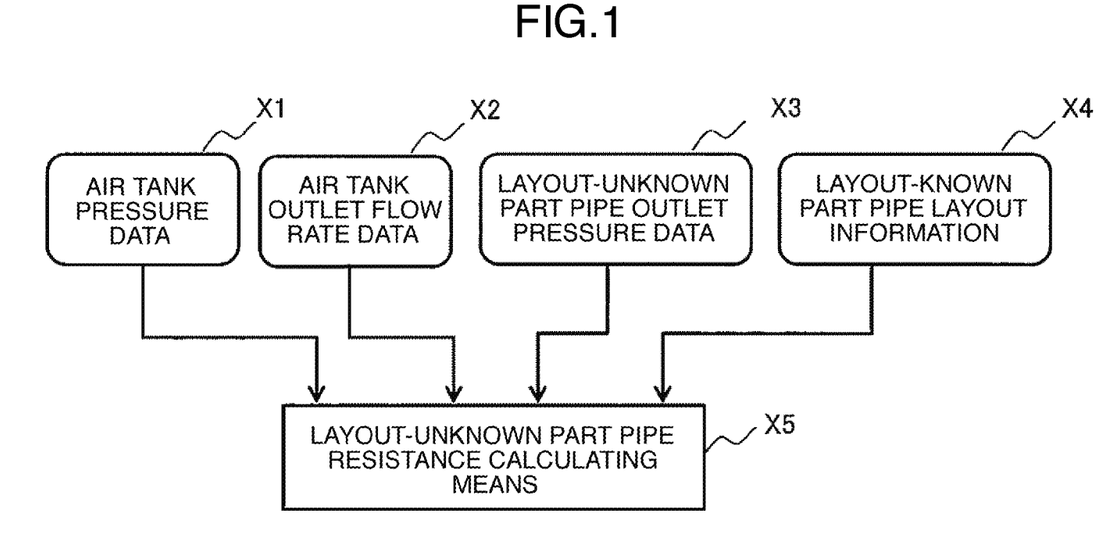
FIG. 1 is a block diagram illustrating a configuration of a pipe network evaluation device according to embodiment 1.

FIG. 1 is a block diagram illustrating a configuration of a pipe network evaluation device according to embodiment 1.

The pipe network evaluation device illustrated in FIG. 1 includes air tank pressure data X1, air tank outlet flow rate data X2, layout-unknown part pipe outlet pressure data X3, layout-known part pipe layout information X4, and layout-unknown part pipe resistance calculating means X5.

The air tank pressure data X1 is a pressure of compressed air in an air tank and may be any pressure of an upstream near the air tank, an inside, and a downstream near the air tank.

The air tank outlet flow rate data X2 is a flow rate of the compressed air supplied from the air tank. The layout-unknown part pipe outlet pressure data X3 is a pressure of the compressed air at a pipe outlet, of which layout information is unknown. The layout-known part pipe layout information X4 is layout information of a pipe and an equipment, of which layout information is known.

The layout-unknown part pipe resistance calculating means X5 calculates a pipe resistance R1 of a layout-unknown part based on the air tank pressure data X1, the air tank outlet flow rate data X2, the layout-unknown part pipe outlet pressure data X3, and the layout-known part pipe layout information X4.

The above is the configuration of the pipe network evaluation device. Next, a specific example of calculating the pipe resistance R1 of the layout-unknown part will be described with reference to FIGS. 2, 3, and 4.

Figure 2:
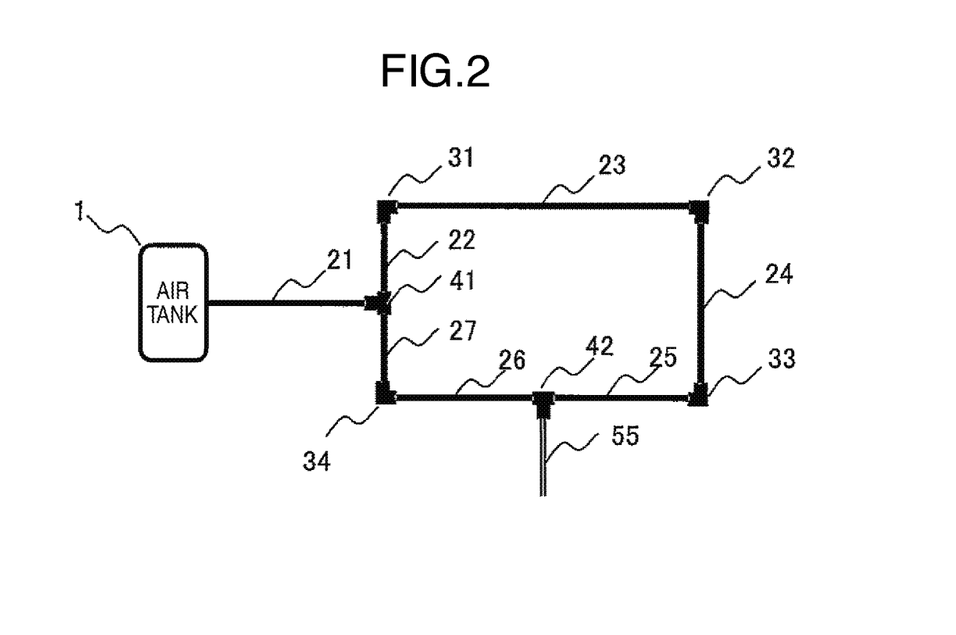
FIG. 2 is an explanatory diagram illustrating a specific example of a factory pipe layout according to embodiment 1.

FIG. 2 illustrates a specific example of a factory pipe layout. The pipe layout illustrated in FIG. 2 includes an air tank 1, pipes 21 to 27, elbows 31 to 34, and branches 41 and 42, of which layout information is known, and a pipe 55, of which layout information is unknown. Here, in FIG. 2, a solid line indicates an equipment of which layout information is known, and a double line indicates an equipment of which layout information is unknown.

Figure 3:
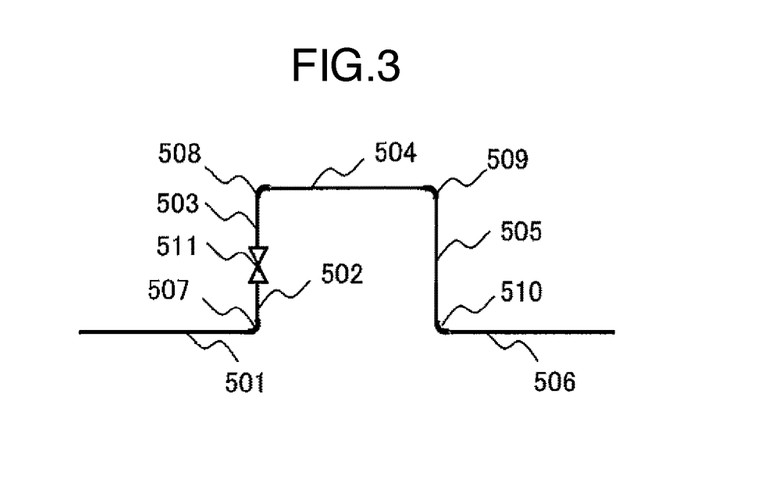
FIG. 3 is an explanatory diagram illustrating an actual layout of a pipe, of which layout information is unknown, according to embodiment 1.

FIG. 3 illustrates an example of an actual layout of the pipe 55 of which layout information is unknown in FIG. 2. It is assumed that there is only one flow path through which compressed air flows. In the example of FIG. 3, the pipe 55 actually includes pipes 501 to 506, elbows 507 to 510, and a valve 511, but it is assumed that all pieces of layout information thereof are unknown.

Figure 4:
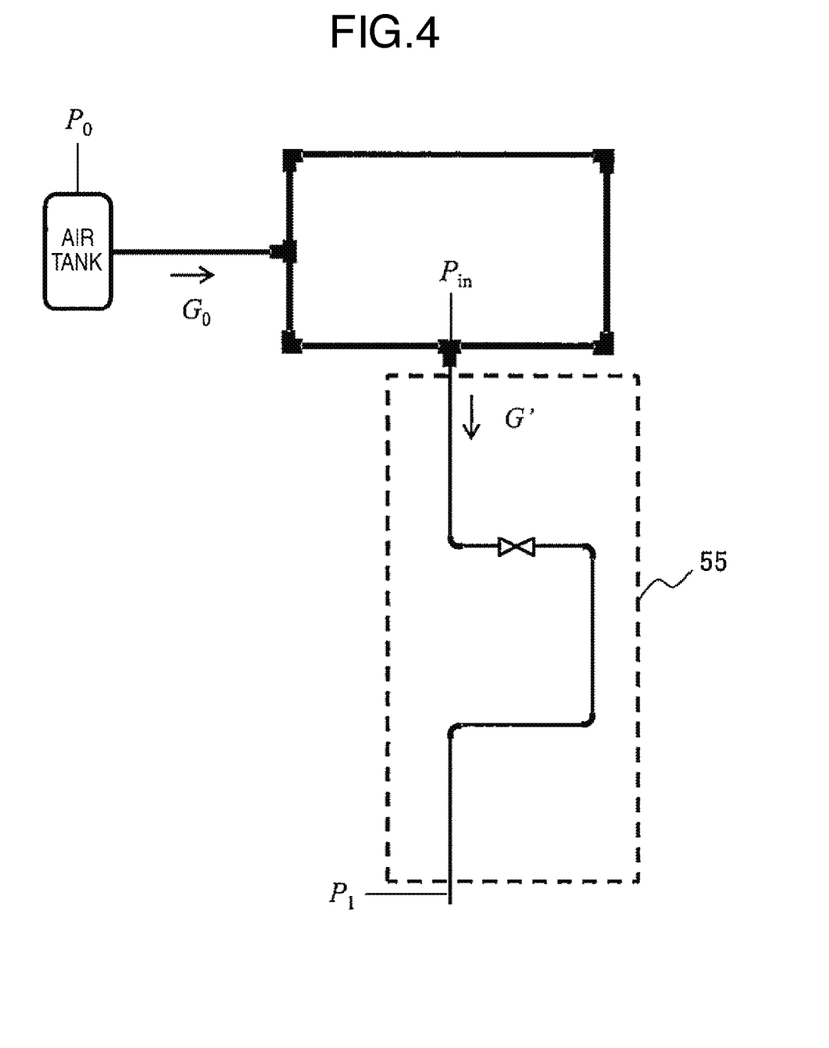
FIG. 4 is a system diagram for describing a method of evaluating a pressure loss of a layout-unknown part according to embodiment 1.
Figure 5:
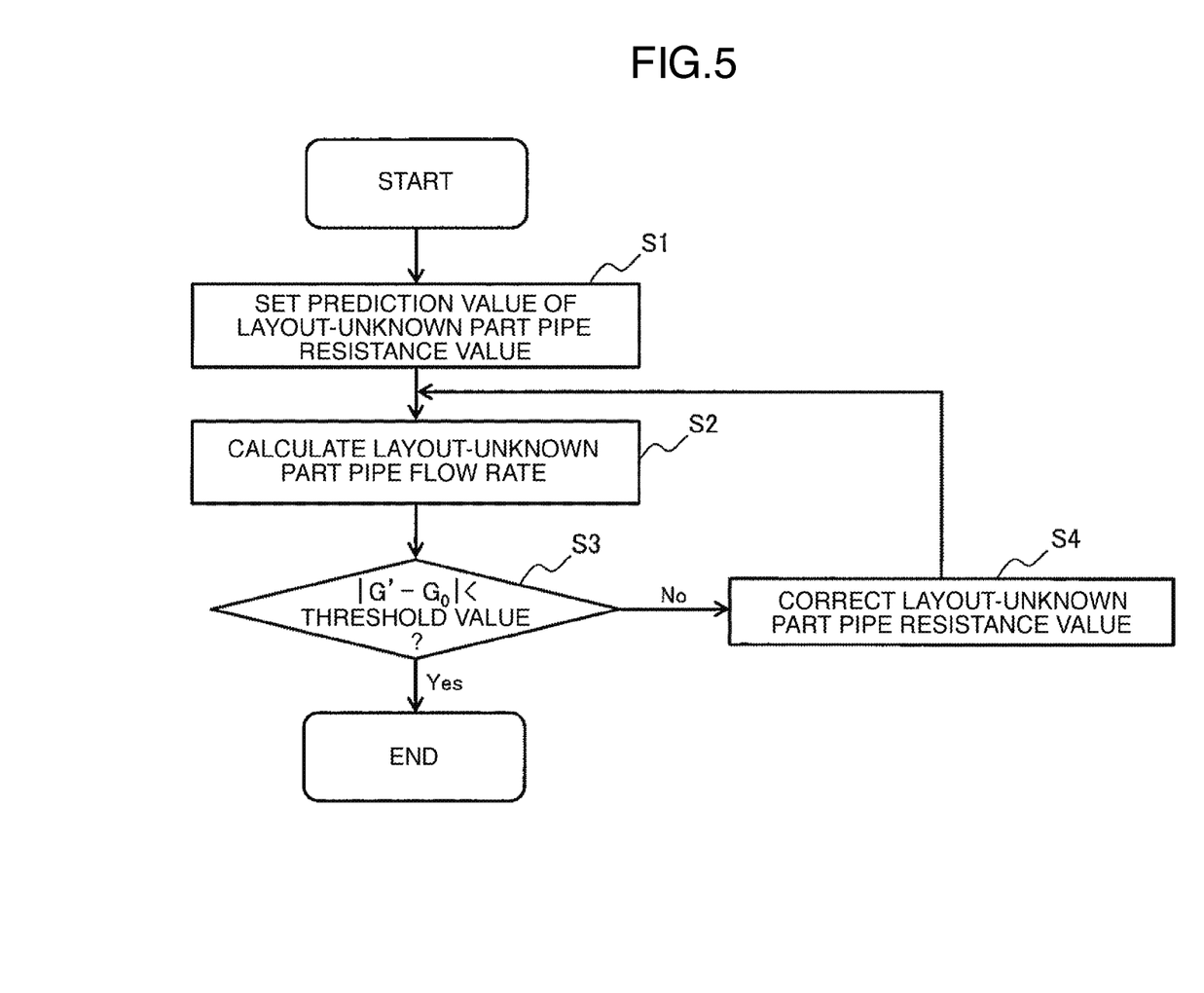
FIG. 5 is a flowchart showing a calculation process of the pipe network evaluation device according to embodiment 1.

A method of evaluating the pressure loss of the layout-unknown part will be described with reference to FIG. 4. FIG. 4 illustrates a pipe layout in which the layout-unknown part pipe 55 in FIG. 2 is replaced with the actual layout illustrated in FIG. 3. Here, in order to evaluate the pressure loss of the layout-unknown part pipe 55 in a dashed line frame, the actual pipe layout information illustrated in FIG. 3 is not essential, and the pipe resistance of the layout-unknown part, the pressure of the layout-unknown part pipe inlet, and the layout-unknown part pipe flow rate have only to be known. That is, the pressure loss of the layout-unknown part pipe 55 is expressed by the following formula (1) as the function of the pipe resistance.

$$\Delta P' = f(R1, P_{in}, G')$$

where $\Delta P'$ is the pressure loss of layout-unknown part pipe 55, R1 is the pipe resistance of layout-unknown part, $P_{in}$ is the pressure of layout-unknown part pipe inlet, and G' is the layout-unknown part pipe flow rate. If R1 is known, $P_{in}$ and G' are acquired by calculating the flow of compressed air in the pipe network. Furthermore, if R1, $P_{in}$, and G' are known, the pressure loss $\Delta P'$ of the layout-unknown part is acquired. $P_0$, $P_1$, and $G_0$ in FIG. 4 will be described below with reference to FIG. 5.

The above is a specific example of calculating the pipe resistance R1 of the layout-unknown part. Next, a flow of a calculation process of a pipe network evaluation device according to a first embodiment of the present invention will be described with reference to FIG. 5.

As step S1 (process of predicting a layout-unknown part pipe resistance value), a pipe resistance value R1 of a layout-unknown part is predicted and substituted. If the predicted value of R1 is unknown, it is substituted as zero.

As step S2 (process of calculating a layout-unknown part pipe flow rate), $\Delta P'$, $P_{in}$, and G' are calculated by calculating the flow of compressed air in the pipe network by using the pipe layout information of the layout-known part, the pressure value $P_0$ stored in the air tank pressure data X1, and the pressure value $P_1$ stored in the layout-unknown part pipe outlet pressure data X3 as boundary conditions.

As step S3 (process of checking a flow rate calculation value and a flow rate measurement value), a difference between the layout-unknown part pipe flow rate G' acquired in step S2 and the flow rate measurement value $G_0$ stored in the air tank outlet flow rate data X2 is calculated and it is determined whether the difference value falls within a certain threshold value. If the determination result is Yes, the process is ended. If No, the process proceeds to step S4 (process of correcting the layout-unknown part pipe resistance value).

As step S4 (process of correcting the layout-unknown part pipe resistance value), a known optimization calculation method is used to correct the unknown part pipe resistance value predicted in step S1, so that an objective function indicated by the following formula (2) is minimized, and the process returns to step S2.

$$\text{objective function: } \int |G' - G_0| dt$$

The above is the flow of the calculation process of the pipe network evaluation device.

In the present embodiment, the pipe resistance of the layout-unknown part is calculated by step S1 (process of predicting the layout-unknown part pipe resistance value), step S2 (process of calculating the layout-unknown part pipe flow rate), step S3 (process of checking the flow rate calculation value and the flow rate measurement value), and step S4 (process of correcting the layout-unknown part pipe resistance value) based on the air tank pressure data X1, the air tank outlet flow rate data X2, the layout-unknown part pipe outlet pressure data X3, and the layout-known part pipe layout information X4. That is, according to the present embodiment, even if it is difficult to acquire the layout information of the equipment constituting the pipe network of the factory, the pipe resistance of the layout-unknown part required for evaluating the pressure loss of the pipe network, without inputting these pieces of information.

Embodiment 2

Figure 6:
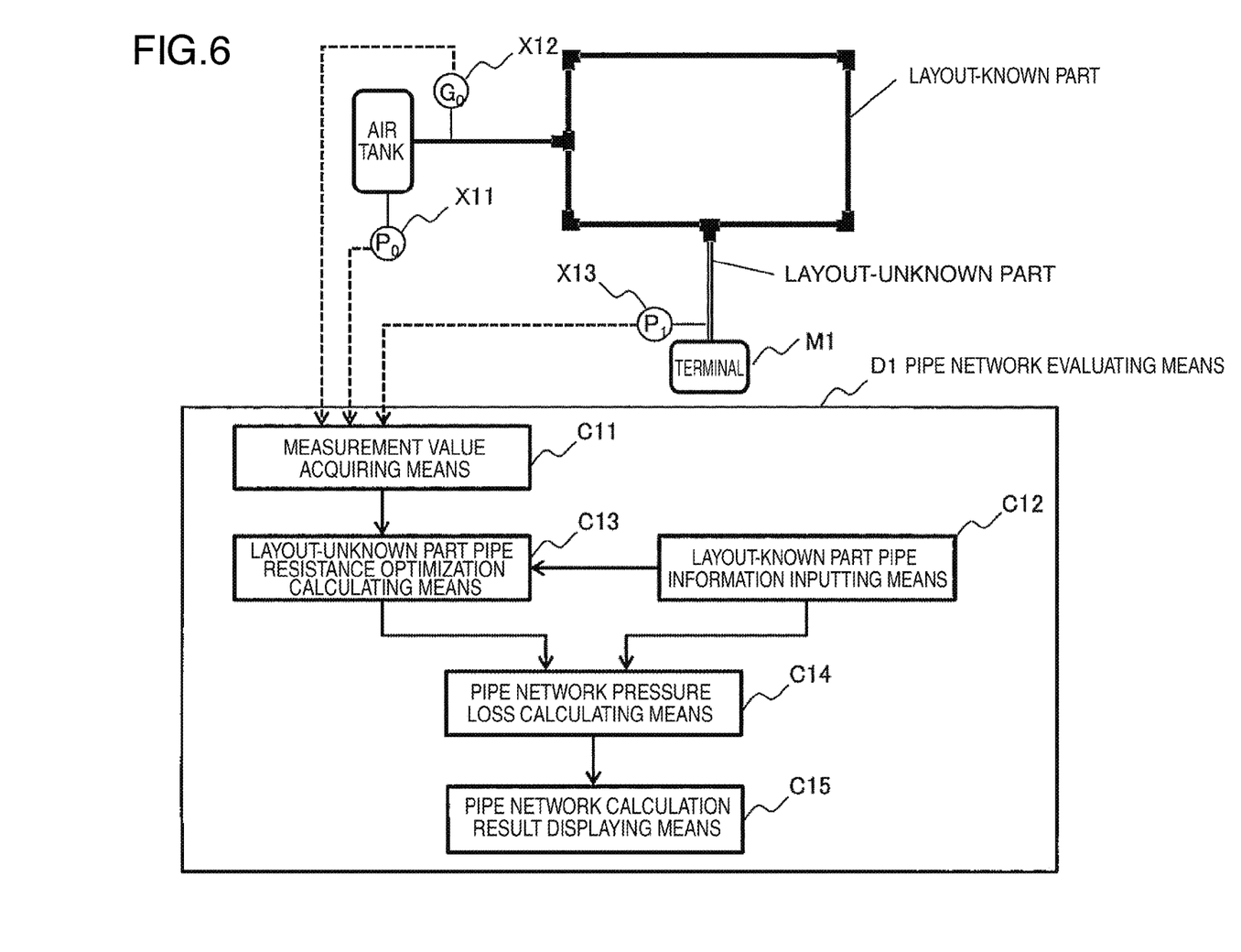
FIG. 6 is a block diagram illustrating a configuration of a pipe network evaluation device according to embodiment 2.

FIG. 6 is a block diagram illustrating a configuration of a pipe network evaluation device according to embodiment 2.

The pipe network evaluation device illustrated in FIG. 6 includes pressure sensors X11 and X13, a flow rate sensor X12, a terminal M1, and a pipe network evaluating means D1.

The pressure sensor X11 detects a pressure in an air tank. The flow rate sensor X12 detects a flow rate of compressed air supplied from the air tank. The pressure sensor X13 detects a pressure at a layout-unknown part pipe outlet. Here, in FIG. 6, a dashed line indicates the flow of data and signals, and detection values of the pressure sensors X11 and X13 and the flow rate sensor X12 are output to the pipe network evaluating means D1.

The terminal M1 is an equipment, such as an air cylinder or an air blow, which is used in a production process of a factory by consuming compressed air.

The pipe network evaluating means D1 receives the detection values of the pressure sensors X11 and X13 and the flow rate sensor X12, calculates the pressure loss of the pipe network and the consumption flow rate of the compressed air in the terminal equipment, and displays the result on a display device.

The pipe network evaluating means D1 includes a measurement value acquiring means C11, a layout-known part pipe information inputting means C12, a layout-unknown part pipe resistance optimization calculating means C13, a pipe network pressure loss calculating means C14, and a pipe network calculation result displaying means C15.

The measurement value acquiring means C11 acquires air tank pressure data $P_0$ detected from the pressure sensor X11, air tank outlet flow rate data $G_0$ detected from the flow rate sensor X12, and layout-unknown part pipe outlet pressure data $P_1$ detected from the pressure sensor X13, and stores the data.

Figure 7:
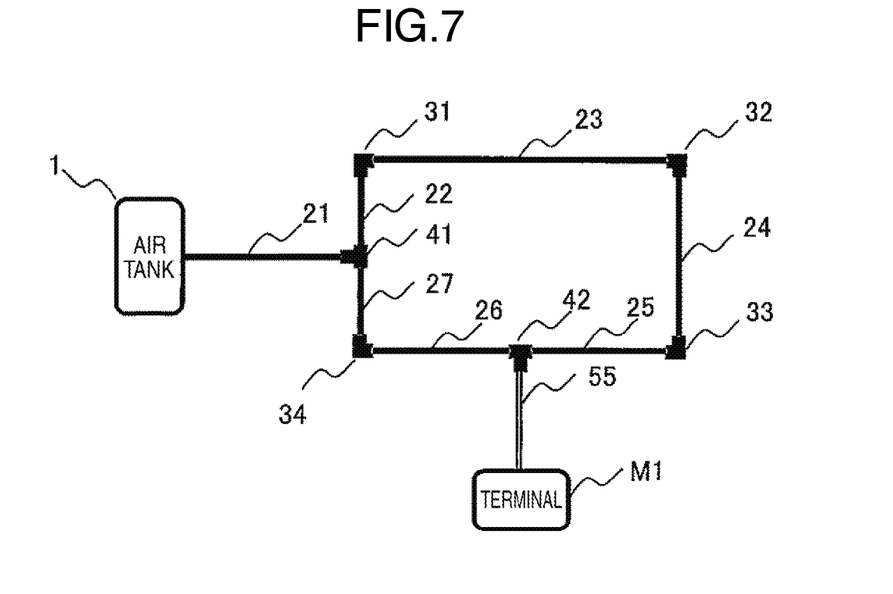
FIG. 7 is an explanatory diagram illustrating a specific example of a factory pipe layout according to embodiment 2.

The layout-known part pipe information inputting means C12 inputs the layout information about the layout-known part pipe. FIG. 7 illustrates a specific example of the factory pipe layout according to the present embodiment. A difference from the specific example of the factory pipe layout according to the first embodiment is that the terminal M1 of which the layout information is known is installed. The other points are the same as those of the first embodiment, and the same parts are denoted by the same reference numerals as those in the previous drawing in FIG. 2, and a description thereof will be omitted. The layout-known part pipe information inputting means C12 inputs the layout information about the air tank 1, the pipes 21 to 27, the elbows 31 to 34, the branches 41 and 42, and the terminal M1, of which layout information is known in FIG. 7.

The layout-unknown part pipe resistance optimization calculating means C13 calculates the resistance R1 of the layout-unknown part pipe 55 by the optimization calculating means, based on the air tank pressure data $P_0$ stored in the measurement value acquiring means C11, the air tank outlet flow rate data $G_0$, the layout-unknown part pipe outlet pressure data $P_1$, and the layout information of the layout-known part pipe input by the layout-known part pipe information inputting means C12.

The pipe network pressure loss calculating means C14 calculates the pressure loss of the pipe network based on the resistance R1 of the layout-unknown part pipe 55 calculated by the layout-unknown part pipe resistance calculating means C13 and the layout information of the layout-known part pipe input by the layout-known part pipe information inputting means C12.

The pipe network calculation result displaying means C15 evaluates characteristics (pressure, flow rate, temperature, and the like) relating to the compressed air flow in the pipe network, based on the pressure loss result of the pipe network calculated by the pipe network pressure loss calculating means C14, and transmits the result to the display device (display). The configuration diagram of the pipe network evaluation device according to embodiment 2 has been described.

Figure 8:
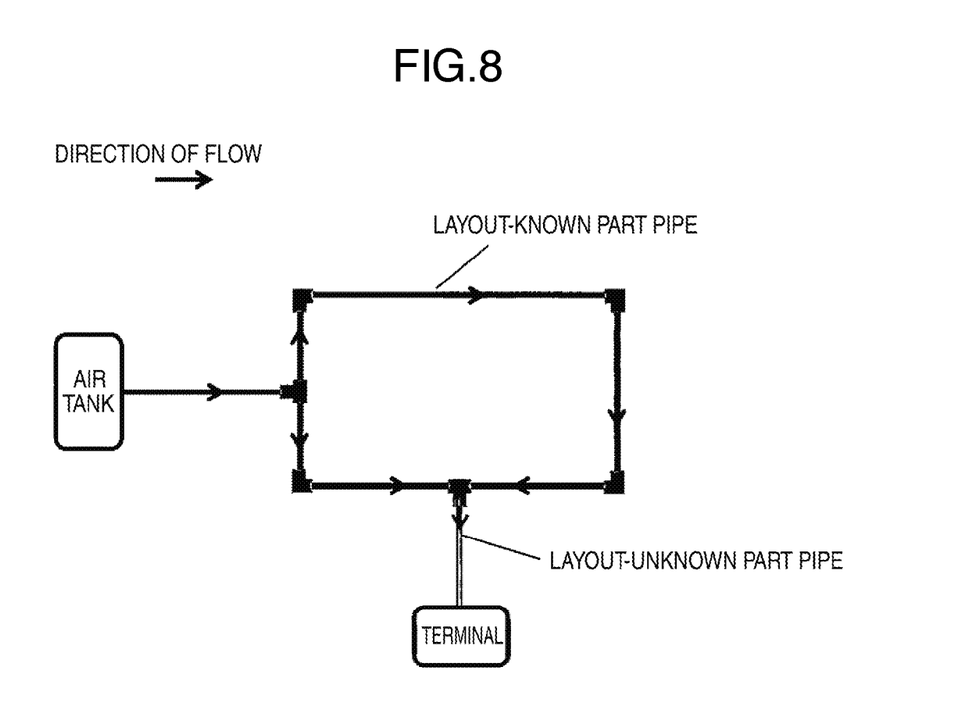
FIG. 8 is an explanatory diagram illustrating a first example of displaying a pipe network calculation result according to embodiment 2.
Figure 9:
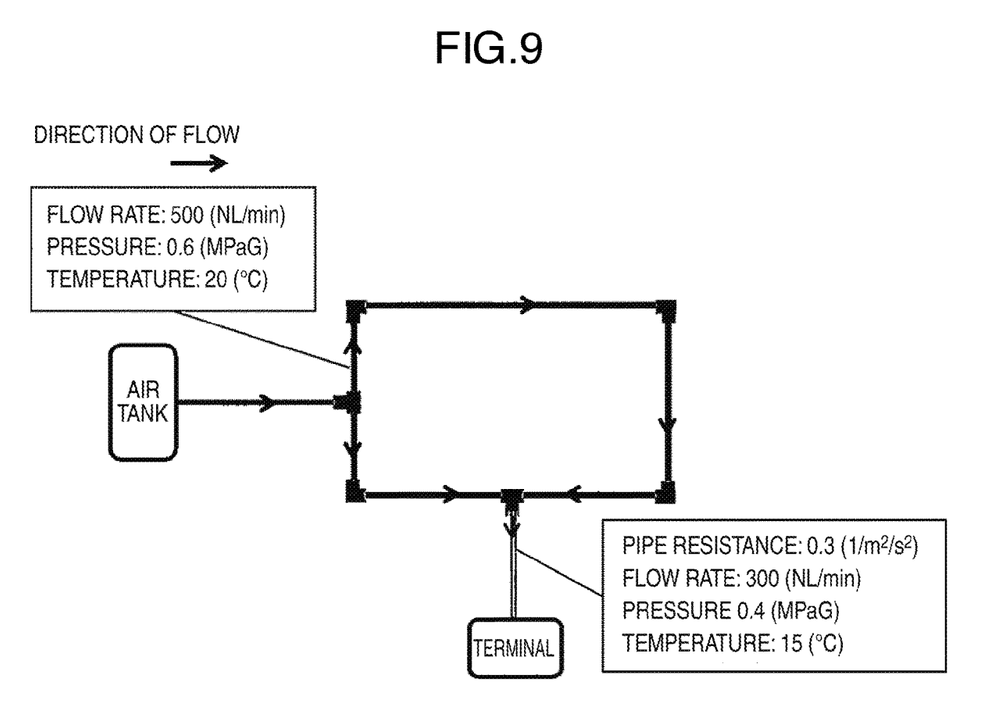
FIG. 9 is an explanatory diagram illustrating a second example of displaying a pipe network calculation result according to embodiment 2.

FIGS. 8 and 9 illustrate examples of display by the pipe network calculation result displaying means C15. FIG. 8 illustrates an example in which the direction of the compressed air flow with respect to the pipe is indicated by arrows. In addition, in the example of FIG. 8, in order to distinguish between the layout-known part pipe and the layout-unknown part pipe, the layout-known part pipe is indicated by a solid line and the layout-unknown part pipe is indicated by a double line.

FIG. 9 illustrates an example in which the flow rate, the pressure, and the temperature for the selected pipe are displayed. An the estimation value of the pipe resistance is also displayed as the calculation result for the layout-unknown part pipe.

In the present embodiment, even in the case of including equipments, of which equipment layout information is difficult to grasp by building drawings, visual inspection, or the like, the pressure loss of the pipe network and the consumption flow rate of the compressed air in each end equipment can be calculated without inputting the layout information. Therefore, it is possible to reduce the time and effort of setting the pipe information. Furthermore, since the pressure loss of the pipe network and the consumption flow rate of the compressed air at each end equipment can be evaluated without installing the flow sensors in the end equipment, the operation of the terminal equipment can also be managed and air leakage information in the factory pipe network can be grasped, leading to energy saving measures.

Embodiment 3

Figure 10:
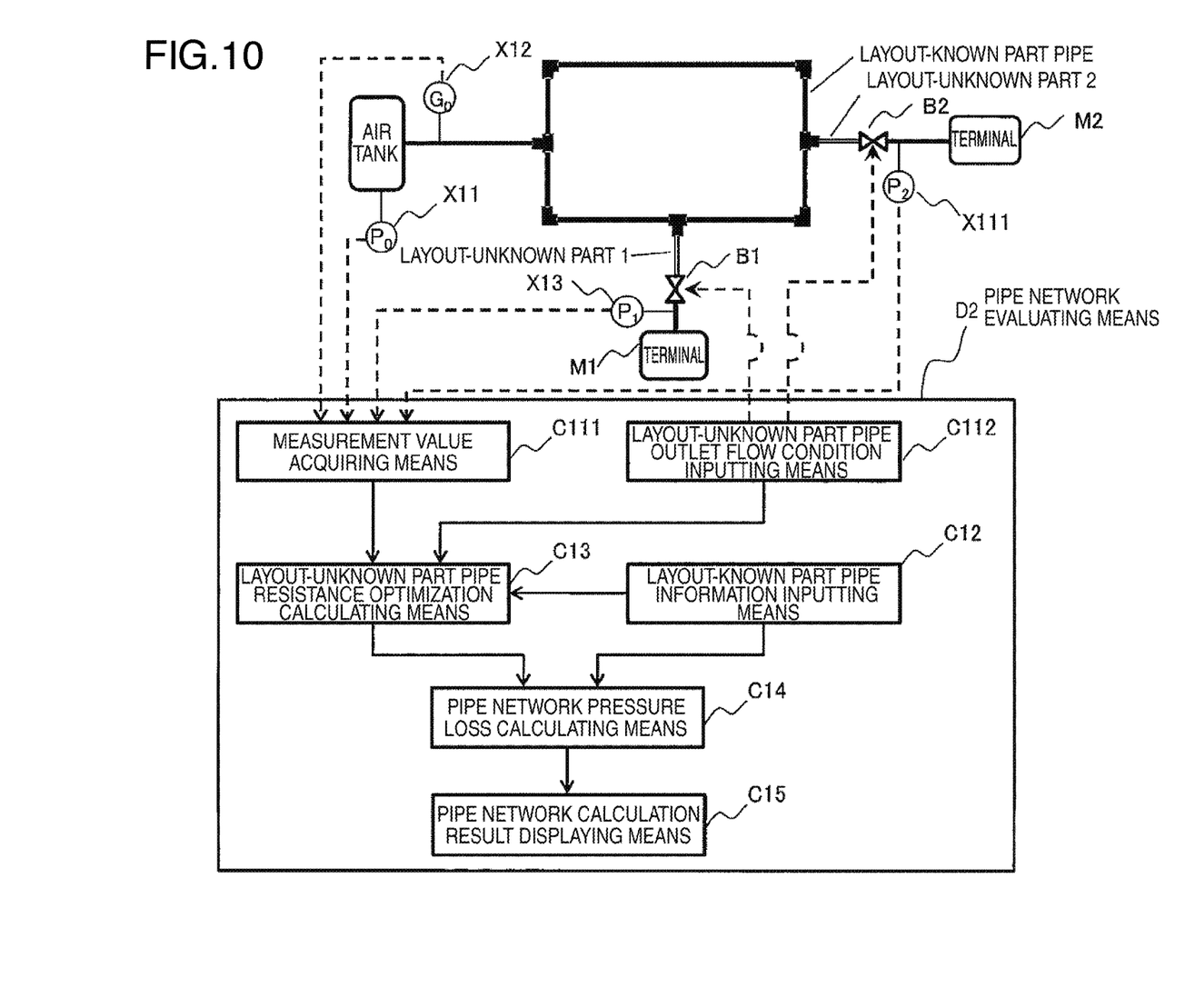
FIG. 10 is a block diagram illustrating a configuration of a pipe network evaluation device according to embodiment 3.

FIG. 10 is a block diagram illustrating a configuration of a pipe network evaluation device according to embodiment 3.

A difference from embodiment 2 is that embodiment 2 includes one layout-unknown part in the pipe network, whereas the present embodiment includes two layout-unknown parts in the pipe network. Specifically, the pipe network evaluation device of the present embodiment includes a pressure sensor X111, a terminal M2, control valves B1 and B2, and a pipe network evaluating means D2, instead of the pipe network evaluating means D1, and the pipe network evaluating means D2 includes a measurement value acquiring means C111 and a layout-unknown part pipe outlet flow condition inputting means C112, instead of the measurement value acquiring means C11.

The pressure sensor X111 detects a pressure at a pipe outlet of the layout-unknown part 2 and outputs a detection value to the pipe network evaluating means D2.

The terminal M2 is an equipment, such as an air cylinder or an air blow, which is used in a production process of a factory by consuming compressed air.

The control valve B1 controls (stops and passes) a compressed air flow supplied to the terminal M1 and adjusts a flow rate. The control valve B2 controls (stops and passes) a compressed air flow supplied to the terminal M2 and adjusts a flow rate.

The pipe network evaluating means D2 receives the detection values of the pressure sensors X11, X13, and X111 and the flow rate sensor X12, calculates the pressure loss of the pipe network and the consumption flow rate of the compressed air in the terminal equipment, and displays the result on a display device.

The measurement value acquiring means C111 acquires air tank pressure data $P_0$ detected from the pressure sensor X11, air tank outlet flow rate data $G_0$ detected from the flow rate sensor X12, pipe outlet pressure data $P_1$ of the layout-unknown part detected from the pressure sensor X13, and pipe outlet pressure data $P_2$ of the layout-unknown part 2 detected from the pressure sensor X111, and stores the data.

The layout-unknown part pipe outlet flow condition inputting means C112 calculates the valve opening degrees of the control valves B1 and B2 and outputs the calculated valve opening degrees to the control valves B1 and B2. A method of calculating the valve opening degrees of the control valves B1 and B2 will be described below with reference to FIGS. 11 and 12.

The point that the present embodiment differs from embodiment 2 has been described, and the other points are the same as embodiment 2.

Figure 11:
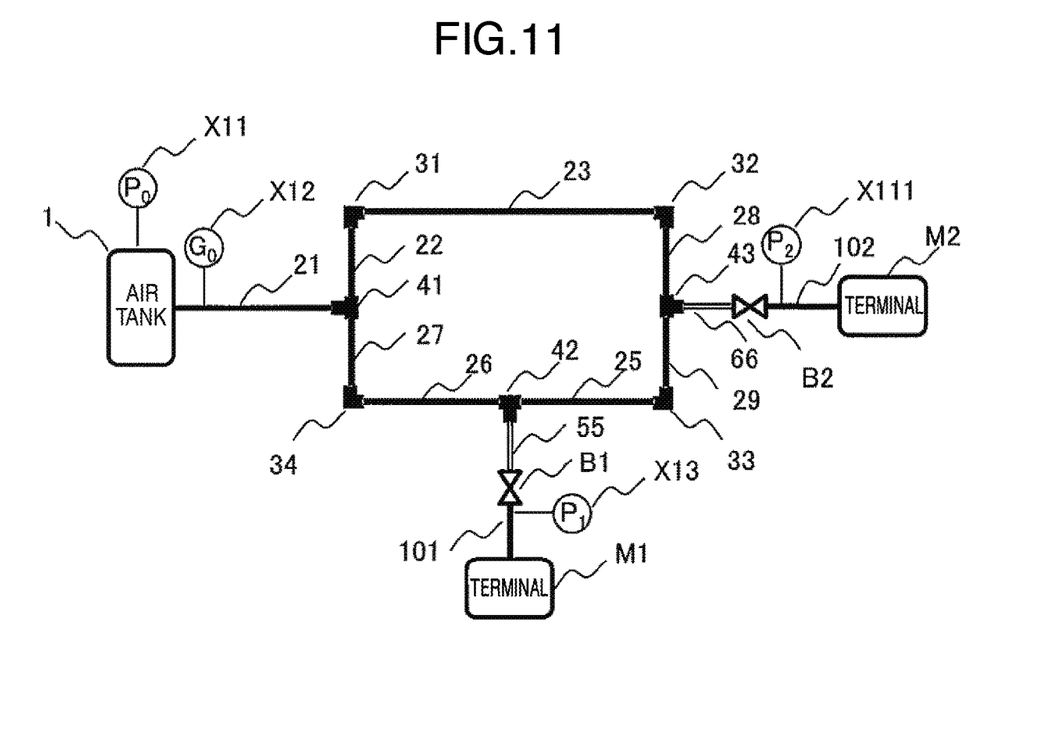
FIG. 11 is an explanatory diagram illustrating a specific example of a factory pipe layout according to embodiment 3.

Next, a method of calculating the valve opening degrees of the control valves B1 and B2 will be described. FIG. 11 illustrates a specific example of a factory pipe layout according to the present embodiment. A difference from the specific example of the factory pipe layout according to embodiment 2 is that pipe 28, 29, 101, and 102 of which layout information is known, control valves B1 and B2, a terminal M2, a pipe 66 of which layout information is unknown, and a pressure sensor X111 for detecting the pressure of the outlet of the layout-unknown part pipe 66 are installed instead of the pipe 24 of which layout information is known. The other points are the same as those of embodiment 2, and the same parts are denoted by the same reference numerals as those in the previous drawing in FIG. 7, and a description thereof will be omitted.

Figure 12:
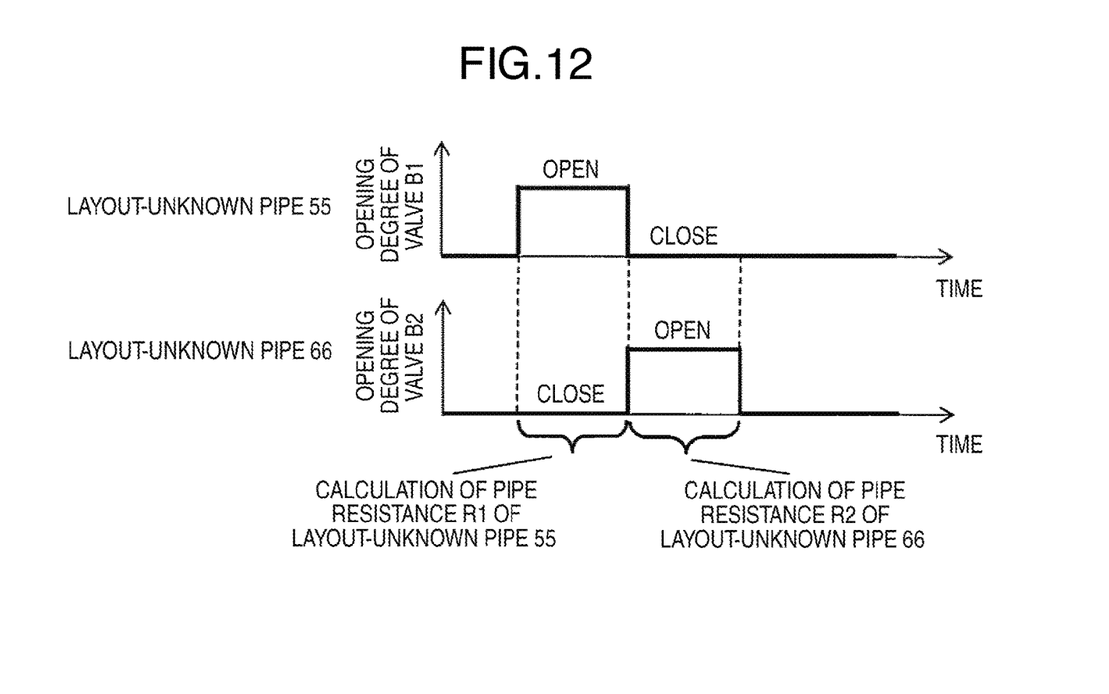
FIG. 12 is an explanatory diagram illustrating an example of setting a layout-unknown part pipe outlet flow condition according to embodiment 3.

FIG. 12 is a diagram illustrating an example of setting a layout-unknown part pipe outlet flow condition. The layout-unknown part pipe outlet flow condition inputting means C112 sets one of the control valves B1 and B2 to an opened state and sets the other to a closed state.

Specifically, for the factory layout of FIG. 11, as illustrated in FIG. 12, the control valve B2 of the outlet is closed with respect to the layout-unknown part pipe 66 during the time period when the control valve B1 of the outlet is opened with respect to the layout-unknown part pipe 55. Based on the condition, the resistance R1 of the layout-unknown part pipe 55 is calculated. Similarly, for the layout-unknown part pipe 66, the control valve B1 of the outlet is closed with respect to the layout-unknown part pipe 55 during the time period when the control valve B2 of the outlet is opened. Based on the condition, the resistance R2 of the layout-unknown part pipe 66 is calculated.

In this embodiment, in addition to each effect acquired in embodiment 2, if there are two layout-unknown parts, the pipe resistance of each layout-unknown part can be acquired by the opening and closing operation of the control valve installed in the layout-unknown part pipe outlet. Therefore, it is possible to calculate the pressure loss of the pipe network and the consumption flow rate of each terminal equipment.

In the present embodiment, the example of the case where there are two layout-unknown parts is shown, but a case where there are two or more layout-unknown part is also applicable. Specifically, the resistance of each layout-unknown part pipe can be acquired by installing the control valves in the respective layout-unknown part pipe outlets, opening one of the control valves and closing the other control valves, and sequentially repeating the process of acquiring the resistance of the layout-unknown part pipe.

In the above embodiments, although the case where the fluid flowing through the pipe network is compressed air compressed by the air compressor has been described, the present invention is not limited thereto. Steam, water, air for air conditioning, oil for hydraulic pressure, and the like may flow through the pipe network.

REFERENCE SIGNS LIST 1 air tank
21 to 27, 28 to 29, 101, 102 pipe of which layout information is known
55, 66, 501 to 506 pipe of which layout information is unknown
31 to 34 elbow of which layout information is known
507 to 510 elbow of which layout information is unknown
41 to 43 branch of which layout information is known
B1, B2 control valve of which layout information is known
511 control valve of which layout information is unknown
M1, M2 terminal of which layout information is known
X1 air tank pressure data
X2 air tank outlet flow rate data
X3 layout-unknown part pipe outlet pressure data
X4 layout-known part pipe layout information
X5 layout-unknown part pipe resistance calculating means
S1 process of predicting layout-unknown part pipe resistance value
S2 process of calculating layout-unknown part pipe flow rate
S3 process of checking flow rate calculation value and flow rate measurement value
S4 process of correcting layout-unknown part pipe resistance value
X11, X13, X111 pressure sensor X12 flow rate sensor
D1 pipe network evaluating means
D2 pipe network evaluating means
C11, C111 measurement value acquiring means
C12 layout-known part pipe information inputting means
C13 layout-unknown part pipe resistance optimization calculating means
C14 pipe network pressure loss calculating means
C15 pipe network calculation result displaying means
C112 layout-unknown part pipe outlet flow condition inputting means

The invention claimed is:

1. A pipe network evaluation device for calculating a flow of compressed air in a pipe network in consideration of a friction loss and a heat loss of a fluid equipment and a pipe based on a pipe network model including the fluid equipment and the pipe, the pipe network evaluation device comprising:
a computer programmed to calculate the flow of the compressed air in the pipe network in consideration of the friction loss and the heat loss of the fluid equipment and the pipe based on the pipe network model including the fluid equipment and the pipe; and
a memory storing a program that is executed by the computer;
wherein the computer includes:
a layout-unknown part pipe resistance calculating means for estimating a pipe resistance of a layout-unknown part, based on:
air tank pressure data, which is pressure data of compressed air in an air tank connected to the pipe network;
air tank outlet flow rate data, which is flow rate data of compressed air supplied from the air tank to the pipe network;
layout-unknown part pipe outlet pressure data, which is outlet pressure data of a part where layout information is unknown; and
layout-known part pipe layout information, which is layout information of a part where layout information is known.

2. The pipe network evaluation device according to claim 1, wherein the layout-unknown part pipe resistance calculating means estimates the pipe resistance of the layout-unknown part for the pipe network via pipe network optimization calculation based on the layout-known part pipe layout information with the air tank pressure data and the layout-unknown part pipe outlet pressure data as boundary conditions until a difference between a pipe flow rate calculation value of the layout-unknown part and a flow rate measurement value stored in the air tank outlet flow rate data falls within a certain threshold value.

3. A pipe network evaluation device for calculating a flow of compressed air in a pipe network in consideration of a friction loss and a heat loss of a fluid equipment and a pipe based on a pipe network model including the fluid equipment and the pipe, the pipe network evaluation device comprising:
a computer programmed to calculate the flow of the compressed air in the pipe network in consideration of the friction loss and the heat loss of the fluid equipment and the pipe based on the pipe network model including the fluid equipment and the pipe;
a memory storing a program that is executed by the computer;
a pressure sensor to detect a pressure in an air tank connected to the pipe network;
a pressure sensor to detect a pressure of a pipe outlet of a layout-unknown part;
a flow rate sensor to detect a flow rate of compressed air supplied from the air tank to the pipe network;
a terminal including an air cylinder or an air blow, used in a production process of a factory as consuming compressed air;
wherein the computer includes:
a measurement value acquiring means for acquiring and storing detection values of the pressure sensor and the flow rate sensor;
a layout-known part pipe information inputting means for inputting pipe layout information, in which layout information is known;
a layout-unknown part pipe resistance optimization calculating means for obtaining a pipe resistance of a layout-unknown part by an optimization calculation method, based on data stored in the measurement value acquiring means and layout-known part pipe information input with the layout-known part pipe information inputting means;
a pipe network pressure loss calculating means for calculating a pressure loss of the pipe network based on a layout-unknown part pipe resistance calculated with the layout-unknown part pipe resistance optimization calculating means and the layout-known part pipe information input with the layout-known part pipe information inputting means; and
a pipe network calculation result displaying means for evaluating characteristics relating to a flow of compressed air in the pipe network based on a pipe network pressure loss calculation result calculated with the pipe network pressure loss calculating means and transmitting the result to a display device.

4. The pipe network evaluation device according to claim 3, wherein the pipe network calculation result displaying means displays distinctively the layout-unknown part pipe and a known part pipe.

5. The pipe network evaluation device according to claim 3, wherein the pipe network calculation result displaying means displays at least one of a pipe resistance calculation result of the layout-unknown part, a pressure, a flow rate, a temperature, and a direction of a fluid flow of one of pipe and equipment.

6. The pipe network evaluation device according to claim 4, comprising:
a pressure sensor to detect a pressure of a pipe outlet of a layout-unknown part;
a terminal including an air cylinder or an air blow, used in a production process of a factory as consuming compressed air;
a first control valve to control a compressed air flow supplied to the terminal and to adjust a flow rate;
a second control valve to control a compressed air flow supplied to the terminal and to adjust a flow rate,
wherein the measurement value acquiring means acquires and stores a detection value of the pressure sensor; and
a layout-unknown pipe outlet flow condition inputting means for calculating a valve opening degree of the first control valve or the second control valve with either the first control valve or the second control valve in an open state and the other in a closed state.

7. A pipe network evaluation method in a pipe network evaluation device including a computer programmed to calculate the flow of the compressed air in the pipe network in consideration of the friction loss and the heat loss of the fluid equipment and the pipe based on the pipe network model including the fluid equipment and the pipe, and a memory storing a program that is executed by the computer, for calculating a flow of compressed air in a pipe network in consideration of a friction loss and a heat loss of a fluid equipment and a pipe based on a pipe network model including the fluid equipment and the pipe, the pipe network evaluation method comprising:

acquiring and storing detection values of
        a pressure sensor to detect a pressure in an air tank connected to the pipe network,
        a pressure sensor to detect a pressure of a pipe outlet of a layout-unknown part, and
        a flow rate sensor to detect a flow rate of compressed air supplied from the air tank to the pipe network;
    inputting pipe layout information, in which layout information is known;
    obtaining a pipe resistance of a layout-unknown part by an optimization calculation method, based on data stored in a measurement value acquiring means and layout-known part pipe information input with a layout-known part pipe information inputting means;
    calculating a pressure loss of the pipe network based on a layout-unknown part pipe resistance calculated with a layout-unknown part pipe resistance optimization calculating means and the layout-known part pipe information input in an inputting layout-known part pipe information process; and
    evaluating characteristics relating to a flow of compressed air in the pipe network based on a pipe network pressure loss result calculated with a pipe network pressure loss calculating means and transmitting the result to a display device.

8. The pipe network evaluation method according to claim 7, comprising:

a pressure sensor to detect a pressure of a pipe outlet of a layout-unknown part;
    controlling a compressed air flow supplied to a terminal and adjusting a flow rate;
    controlling a compressed air flow supplied to a terminal and adjusting a flow rate;
    acquiring and storing a detection value of the pressure sensor; and
    calculating a valve opening degree of the control valve with one of a plurality of control valves in an open state and the other in a closed state.

\* \* \* \* \*